(12) United States Patent
Sethi et al.

(10) Patent No.: US 12,250,285 B2
(45) Date of Patent: Mar. 11, 2025

(54) NETWORK ORCHESTRATION FOR DEVICE MANAGEMENT OPERATIONS

(71) Applicant: Dell Products L.P., Round Rock, TX (US)

(72) Inventors: Parminder Singh Sethi, Ludhiana (IN); Sanjay Singh, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 500 days.

(21) Appl. No.: 17/714,595

(22) Filed: Apr. 6, 2022

(65) Prior Publication Data

US 2023/0328157 A1    Oct. 12, 2023

(51) Int. Cl.
| | | |
|---|---|---|
| *H04W 48/18* | (2009.01) | |
| *H04L 1/00* | (2006.01) | |
| *H04L 69/08* | (2022.01) | |
| *H04W 36/00* | (2009.01) | |
| *H04W 80/04* | (2009.01) | |

(52) U.S. Cl.
CPC ............ *H04L 69/08* (2013.01); *H04L 1/0009* (2013.01); *H04W 48/18* (2013.01); *H04W 36/0022* (2013.01); *H04W 80/04* (2013.01)

(58) Field of Classification Search
None
See application file for complete search history.

(56) References Cited

U.S. PATENT DOCUMENTS

| | | | | |
|---|---|---|---|---|
| 2003/0154297 | A1* | 8/2003 | Suzuki | H04L 69/168 |
| | | | | 709/229 |
| 2015/0245160 | A1* | 8/2015 | Agrawal | H04L 41/145 |
| | | | | 455/406 |
| 2022/0303869 | A1* | 9/2022 | Paradkar | H04W 76/15 |
| 2023/0422085 | A1* | 12/2023 | Babbellapati | H04W 28/0268 |
| 2024/0283756 | A1* | 8/2024 | He | H04L 63/0485 |

OTHER PUBLICATIONS

Wikipedia, "IPoE," https://en.wikipedia.org/wiki/IPoE#:~:text=Internet, Oct. 14, 2021, 1 page.
Wikipedia, "5G Network Slicing," https://en.wikipedia.org/wiki/5G_network_slicing, Feb. 16, 2022, 7 pages.
Dell Technologies, "Dell EMC SupportAssist Enterprise 2.x—Guide and Download," https://www.dell.com/support/kbdoc/en-us/000179530/dell-emc-supportassist-enterprise-2-x-guide-and-download, Article No. 000179530, Accessed Mar. 21, 2022, 10 pages.

(Continued)

*Primary Examiner* — Jenkey Van
(74) *Attorney, Agent, or Firm* — Ryan, Mason & Lewis, LLP

(57) ABSTRACT

A method comprises receiving data from a device over at least a first network and analyzing the data to identify one or more parameters for transmission of the data to a computing site. Based, at least in part, on the one or more parameters, at least a second network to be utilized for transmission of the data to the computing site is determined, wherein the second network is different from the first network. In the method, the data is configured for transmission over at least the second network, and is sent to at least the second network for transmission to the computing site.

20 Claims, 8 Drawing Sheets

(56) References Cited

OTHER PUBLICATIONS

Wikipedia, "High Availability," https://en.wikipedia.org/wiki/High_availability#, Feb. 28, 2022, 8 pages.

Gokhankosem, "IP over Ethernet and OPOE versus PPPOE," https://ipcisco.com/ip-over-ethernet-and-ipoe-versus-pppoe/, Oct. 28, 2020, 16 pages.

Faction, "What is Data Gravity? How it Can Influence Your Cloud Strategy," https://www.factioninc.com/blog/data-gravity-as-the-center-of-your-multi-cloud-universe/, Nov. 20, 2021, 11 pages.

T. Tovinger, "Management, Orchestration and Charging for 5G networks." https://www.3gpp.org/news-events/1951-sa5_5g, Mar. 22, 2018, 8 pages.

Alienor, "The Network Layers Explained [with examples]" https://www.plixer.com/blog/network-layers-explained/, Nov. 28, 2018, 18 pages.

A. O'Keeffe, "The Difference Between Layer 3 and Layer 2 Networks," https://www.aussiebroadband.com.au/blog/difference-layer-3-layer-2-networks/, Oct. 20, 2018, 15 pages.

S. Zaharoff, "What is Brownfield (brownfield deployment, brownfield site)?" https://www.techtarget.com/searchdatacenter/definition/brownfield-site, Jun. 2015, 3 pages.

\* cited by examiner

| APPLICATION | INPUT 1 (LATENCY) | INPUT 2 (BANDWIDTH) | INPUT 3 (SECURITY) | CHARGING FUNCTION (CF) | PRIORITY |
|---|---|---|---|---|---|
| A | 1ms | 1Mbps | YES | S-NW, L-BW | 1 |
| B | 10ms | 1Mbps | No | L-BW | 2 |
| C | 1ms | 10Mbps | No | H-BW | 1 |
| D | 10ms | 10Mbps | Yes | S-NW, H-BW | 2 |

NETWORK ORCHESTRATION FOR DEVICE MANAGEMENT OPERATIONS

FIELD

The field relates generally to information processing systems, and more particularly to device management in such information processing systems.

BACKGROUND

An edge computing architecture moves at least a portion of data processing to the periphery of a network to be closer to a data source rather than to a centralized location, e.g., data center. For example, instead of transmitting raw data to a data center to be processed and analyzed, such tasks or workloads are performed at or near locations where the data is actually generated. Edge computing architectures of this type can help to conserve network bandwidth, while also reducing latency and congestion, thus improving overall system performance.

It is estimated that the amount of data being processed at edge locations will increase in upcoming years. Since many edge devices utilize newer transmission protocols, orchestration of data transmission utilizing multiple transmission protocols is needed in connection with device management operations that maintain devices in active and healthy states.

SUMMARY

Embodiments provide a device management platform in an information processing system.

For example, in one embodiment, a method comprises receiving data from a device over at least a first network and analyzing the data to identify one or more parameters for transmission of the data to a computing site. Based, at least in part, on the one or more parameters, at least a second network to be utilized for transmission of the data to the computing site is determined, wherein the second network is different from the first network. In the method, the data is configured for transmission over at least the second network, and is sent to at least the second network for transmission to the computing site.

Further illustrative embodiments are provided in the form of a non-transitory computer-readable storage medium having embodied therein executable program code that when executed by a processor causes the processor to perform the above steps. Still further illustrative embodiments comprise an apparatus with a processor and a memory configured to perform the above steps.

These and other features and advantages of embodiments described herein will become more apparent from the accompanying drawings and the following detailed description.

BRIEF DESCRIPTION OF THE DRAWINGS

FIG. 4 depicts a table of network priority assignment based on application requirements in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources. Such systems are considered examples of what are more generally referred to herein as cloud-based computing environments. Some cloud infrastructures are within the exclusive control and management of a given enterprise, and therefore are considered "private clouds." The term "enterprise" as used herein is intended to be broadly construed, and may comprise, for example, one or more businesses, one or more corporations or any other one or more entities, groups, or organizations. An "entity" as illustratively used herein may be a person or system. On the other hand, cloud infrastructures that are used by multiple enterprises, and not necessarily controlled or managed by any of the multiple enterprises but rather respectively controlled and managed by third-party cloud providers, are typically considered "public clouds." Enterprises can choose to host their applications or services on private clouds, public clouds, and/or a combination of private and public clouds (hybrid clouds) with a vast array of computing resources attached to or otherwise a part of the infrastructure. Numerous other types of enterprise computing and storage systems are also encompassed by the term "information processing system" as that term is broadly used herein.

As used herein, "real-time" refers to output within strict time constraints. Real-time output can be understood to be instantaneous or on the order of milliseconds or microseconds. Real-time output can occur when the connections with a network are continuous and a user device receives messages without any significant time delay. Of course, it should be understood that depending on the particular temporal nature of the system in which an embodiment is implemented, other appropriate timescales that provide at least contemporaneous performance and output can be achieved.

Figure 1:
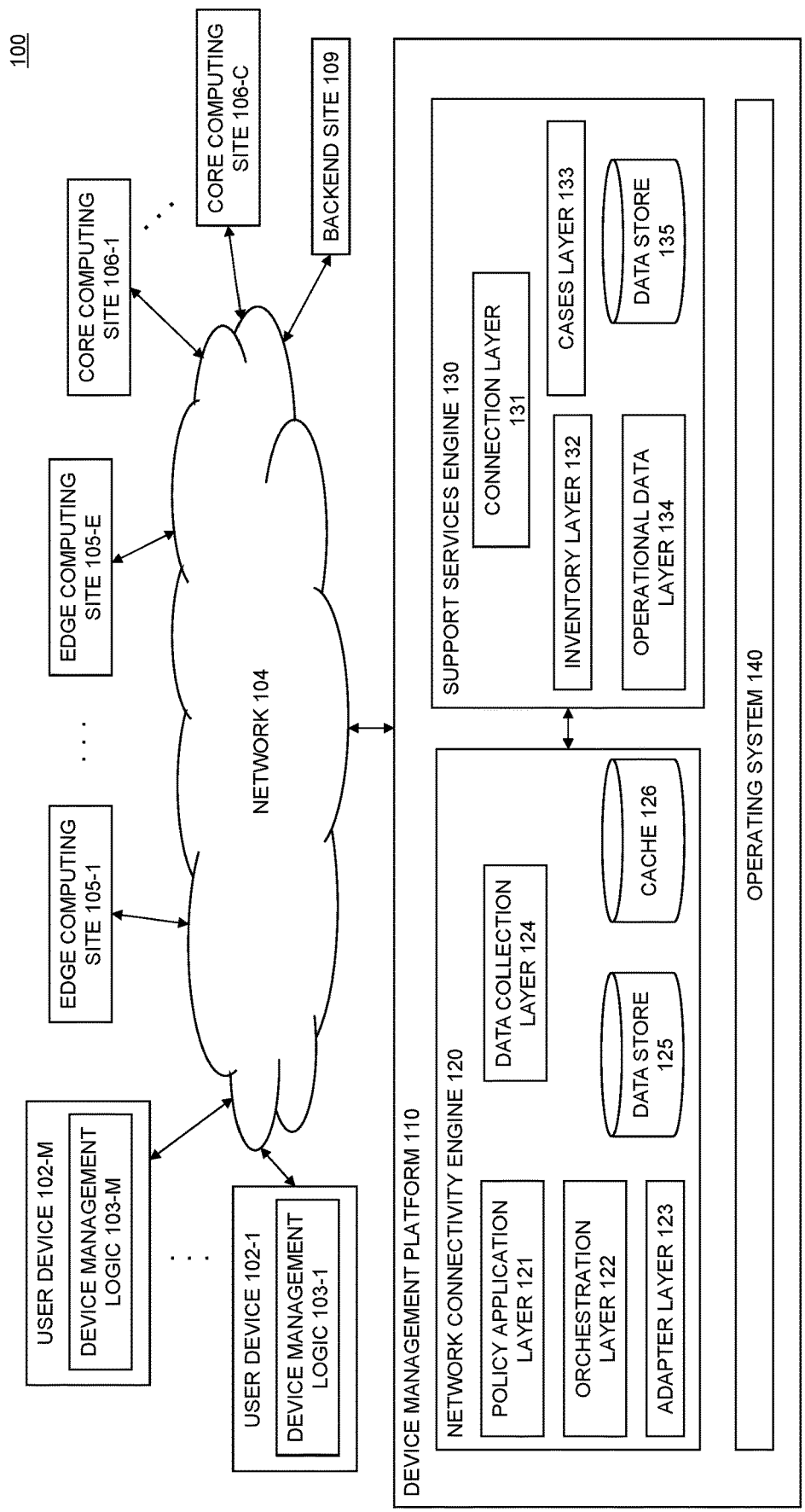
FIG. 1 depicts an information processing system with a device management platform for orchestrating network connectivity in connection with device management operations in an illustrative embodiment.

FIG. 1 shows an information processing system 100 configured in accordance with an illustrative embodiment. The information processing system 100 comprises user devices 102-1, . . . 102-M (collectively "user devices 102") including respective instances of device management logic 103-1, . . . 103-M (collectively "device management logic 103"). The information processing system 100 further comprises edge computing sites 105-1, . . . 105-E (collectively "edge computing sites 105"), core computing sites 106-1, . . . 106-C (collectively "core computing sites 106") and at least one backend site 109. The user devices 102 communicate over the network 104 (which may comprise multiple networks) with a device management platform 110, and with edge computing sites 105, core computing sites 106 and/or a backend site 109. The variables C, E and M and other similar index variables herein such as K, L and P are assumed to be arbitrary positive integers greater than or equal to one.

The user devices 102 can comprise, for example, desktop, laptop or tablet computers, servers, host devices, storage devices, switches, mobile telephones, Internet of Things (IoT) devices or other types of processing devices capable of communicating with the device management platform 110 over the network 104. Such devices are examples of what are more generally referred to herein as "processing devices." Some of these processing devices are also generally referred to herein as "computers." The user devices 102 may also or alternately comprise virtualized computing resources, such as virtual machines (VMs), containers, etc. The user devices 102 in some embodiments comprise respective computers associated with a particular company, organization or other enterprise. In some embodiments, the user devices 102 may be data center devices. However, the embodiments are not necessarily limited thereto, and may be applied to different devices (e.g., customer or client devices) that are not necessarily part of and/or located in a data center.

The terms "user" or "administrator" herein are intended to be broadly construed so as to encompass numerous arrangements of human, hardware, software or firmware entities, as well as combinations of such entities. At least a portion of the available services and functionalities provided by the device management platform 110 in some embodiments may be provided under Function-as-a-Service ("FaaS"), Containers-as-a-Service ("CaaS") and/or Platform-as-a-Service ("PaaS") models, including cloud-based FaaS, CaaS and PaaS environments.

Although not explicitly shown in FIG. 1, one or more input-output devices such as keyboards, displays or other types of input-output devices may be used to support one or more user interfaces to the device management platform 110, as well as to support communication between the device management platform 110, connected devices (e.g., user devices 102), connected sites (e.g., edge computing sites 105, core computing sites 106 and backend site 109) and/or other related systems and devices not explicitly shown.

In some embodiments, the user devices 102 are assumed to be associated with repair and/or support technicians, system administrators, information technology (IT) managers, software developers, release management personnel or other authorized personnel configured to access and utilize the device management platform 110.

The edge computing sites 105 may each comprise one or more edge stations or other types and arrangements of edge nodes. Each of the edge computing sites 105 illustratively comprises a plurality of edge devices. The core computing sites 106 and backend site 109 may each comprise one or more data centers or other types and arrangements of core nodes. The core computing sites 106 and/or backend site 109 illustratively comprise at least one data center implemented at least in part utilizing cloud infrastructure. Each such node of an edge computing site 105, core computing site 106, backend site 109 or other computing site comprises at least one processing device that includes a processor coupled to a memory.

Figure 2B:
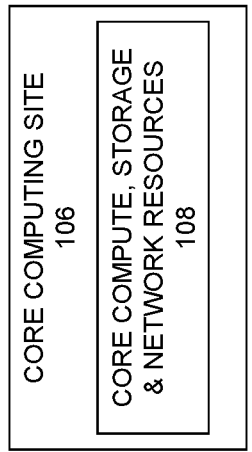
FIGS. 2A and 2B respectively depict edge and core computing sites in an illustrative embodiment.
Figure 2A:
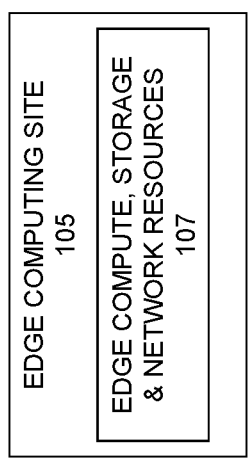

The edge computing sites 105 and the core computing sites 106 illustratively execute at least portions of various workloads for system users. Such workloads may comprise one or more applications. As used herein, the term "application" is intended to be broadly construed to encompass, for example, microservices and other types of services implemented in software executed by the sites 105 or 106. Such applications can include edge-hosted applications running on the edge computing sites 105 and core-hosted applications running on the core computing sites 106. Referring to FIGS. 2A and 2B, an example edge computing site 105 comprises a set of edge compute, storage and/or network resources 107. A given such set of edge resources illustratively comprises at least one of compute, storage and network resources of one or more edge devices of the corresponding edge computing site. Similarly, an example core computing site 106 comprises a set of core compute, storage and/or network resources 108.

Edge and core compute resources of the edge and core computing sites 105 and 106 can include, for example, various arrangements of processors, possibly including associated accelerators. Edge and core storage resources of the edge and core computing sites 105 and 106 can include, for example, one or more storage systems or portions thereof that are part of or otherwise associated with the edge and core computing sites 105 and 106. A given such storage system may comprise, for example, all-flash and hybrid flash storage arrays, software-defined storage systems, cloud storage systems, object-based storage systems, and scale-out distributed storage clusters. Combinations of multiple ones of these and other storage types can also be used in implementing a given storage system in an illustrative embodiment. Edge and core network resources of the edge and core computing sites 105 and 106 can include, for example, resources of various types of network interface devices providing particular bandwidth, data rate and communication protocol features.

One or more of the edge computing sites 105 each comprise a plurality of edge devices, with a given such edge device comprising a processing device that includes a processor coupled to a memory. One or more core computing sites 106 may comprise, for example, at least one data center implemented at least in part utilizing cloud infrastructure. It is to be appreciated, however, that illustrative embodiments disclosed herein do not require the use of cloud infrastructure. The one or more edge computing sites 105 and core computing sites 106 are each assumed to be implemented using at least one processing device of at least one processing platform. Each such processing device generally comprises at least one processor and an associated memory, and implements at least a portion of the functionality of the edge and core compute, storage and/or network resources. Such processing devices can illustratively include particular arrangements of compute, storage and network resources.

As noted herein above, many edge devices utilize newer transmission protocols. As a result, conventional approaches that use wires, WiFi and/or WiMAX connectivity in connection with device management operations are not sufficient for data transmission to and from devices at edge locations. Illustrative embodiments provide a connectivity framework that incorporates and manages data transmission over networks utilizing protocols other than wired, WiFi and/or WiMAX transmission protocols. In more detail, illustrative embodiments provide techniques for management of devices that utilize newer and conventional transmission protocols. For example, in addition to using wired, WiFi and WiMAX connectivity, the embodiments identify situations where newer transmission protocols and networks are needed, and employ the identified protocols and networks in connection with device management and data transmission. The newer networks may comprise, for example, Private Long-Term Evolution (pLTE), 4G (4G LTE) and 5G (e.g., 5G stand-alone (5G SA), 5G non-stand-alone (5G NSA)) networks and their corresponding transmission protocols.

The device management platform 110 in the present embodiment is assumed to be accessible to the user devices 102, edge computing sites 105, core computing sites 106, backend site 109 and vice versa over the network 104. Additionally, as explained in more detail herein, through orchestration and management provided by the device management platform 110, the user devices 102 access and/or send workloads and/or data to one or more of the edge computing sites 105, core computing sites 106 and/or backend site 109 over the network 104. The network 104 is assumed to comprise a portion of a global computer network such as the Internet, although other types of networks can be part of the network 104, including a wide area network (WAN), a local area network (LAN), a satellite network, a telephone or cable network, a cellular network such as 4G (e.g., 4G LTE) or 5G (e.g., 5G stand-alone (5G SA), 5G non-stand-alone (5G NSA)), a private network (e.g., pLTE), a wired network, a wireless network such as a WiFi or WiMAX network, or various portions or combinations of these and other types of networks. As explained in more detail herein, the network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

Referring to FIG. 1, the device management platform 110 includes a network connectivity engine 120 and a support services engine 130. The device management platform 110 runs on an underlying operating system (OS) 140 such as, for example, a Windows® or Linux® OS. The network connectivity engine 120 includes a policy application layer 121, an orchestration layer 122, an adapter layer 123, a data collection layer 124, a data store 125 and a cache 126. The support services engine 130 includes a connection layer 131, an inventory layer 132, a cases layer 133, an operational data layer 134 and a data store 135.

The instances of device management logic 103 in the user devices 102 can be configured to collect data from the user devices 102, the data comprising information identifying the user devices 102 and the components of the user devices 102, information corresponding to alerts about the health and operational status of the components of the user devices 102, information corresponding to applications running on the user devices 102 and information corresponding to workloads that from the user devices 102 that need to be processed by edge and/or core computing sites 105 and 106. As used herein, a "component" is to be broadly construed, and can refer to various parts, hardware components and/or software components such as, but not necessarily limited to, storage devices (e.g., hard disk drives), batteries, chassis, display panels, motherboards, central processing units (CPUs), controllers, cards, heat sinks, fans, fan assemblies, processors, ports, port connectors, host bus adaptors (HBAs), speakers, keyboards, memories, servers, switches, sensors, buses (e.g., serial buses) or other elements of a user device 102.

In an illustrative embodiment, the data collected by the instances of device management logic 103 is received and/or retrieved by the device management platform 110 via the connection layer 131 of the support services engine 130 and provided to the data collection layer 124 of the network connectivity engine 120. In illustrative embodiments, the data received and/or retrieved via the connection layer 131 is sent to the inventory layer 132, which classifies the data based on origin (e.g., user device 102, component, application, etc.), and sends the classified data to the data collection layer 124. The data received by the data collection layer 124 is stored in at least one data store 125.

The data received and/or retrieved by the device management platform 110 is received over, for example, a first network, such as a wired and/or wireless (e.g., WiFi or WiMAX) network. In illustrative embodiments, the policy application layer 121 analyzes the data to identify one or more parameters for transmission of the data to one or more edge computing sites 105 and/or core computing sites 106. The one or more parameters for transmission of the data comprise, but are not necessarily limited to latency, bandwidth, security and/or data gravity. Based, at least in part, on the one or more parameters, the policy application layer 121 of the network connectivity engine 120 determines at least a second network to be utilized for transmission of the data to the one or more edge computing sites 105 and/or core computing sites 106. The second network is different from the first network, and comprises, but is not necessarily limited to, a 4G network, a 5G network and/or a private network (e.g., pLTE).

Figure 3:
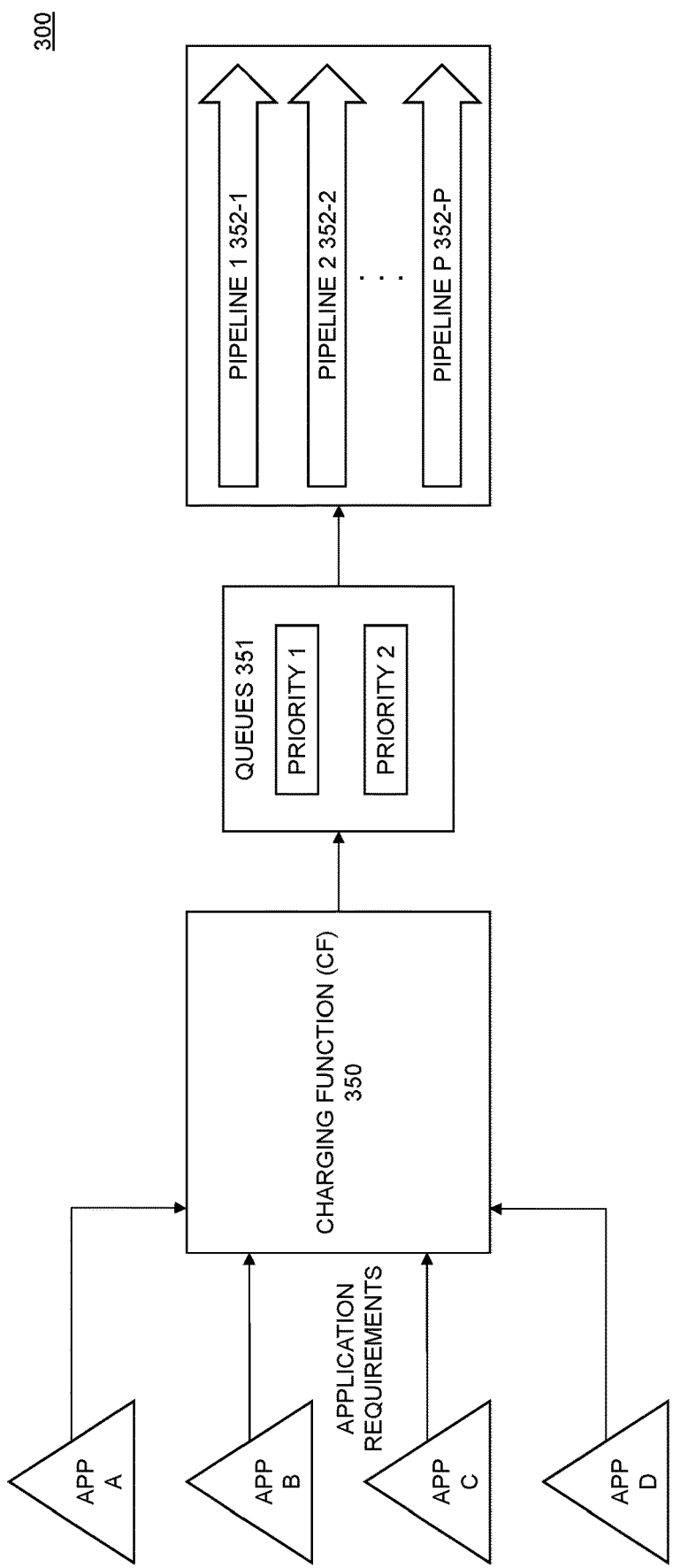
FIG. 3 depicts an operational flow for assignment of applications to different networks based on application requirements in an illustrative embodiment.

Referring to the operational flow 300 in FIG. 3, the parameters are specified as requirements for respective ones of a plurality of applications (APPs) A, B, C and D and/or workloads provided from the user devices 102. The application requirements are input to a charging function (CF) 350, which may be an element of the policy application layer 121. The charging function 350 identifies which of the one or more parameters correspond to respective ones of the plurality of applications A, B, C and D. For example, a given application may specify and/or require high bandwidth and low latency, while another application may specify and/or require a secure network and low bandwidth. In some cases, an application may not specify or require one or more of the parameters. Such requirements and/or specifications may be identified, for example, in metadata associated with an application, in commands or instructions associated with an application, in application code, and/or in service level agreements (SLAs) accessible to the policy application layer 121. The SLAs may be associated with a user device 102 and/or application. In some embodiments, the charging function 350 allows tenants and/or end-users to request that enhanced SLAs with stricter application requirements be implemented to introduce enhanced constraints than those specified and/or required by an application or workload.

In illustrative embodiments, the charging function 350 defines critical values that affect network selection (e.g., selection of the second network) by assigning weights to input variables such as, for example, required latency, bandwidth, security, data gravity, etc. For example, some parameters may be assigned higher weights based on whether those parameters are more crucial to the processing of the application to workload than other parameters. For example, in the case of video processing applications, high bandwidth may be weighted higher than other factors, in the case of applications transmitting sensitive information, network security may be weighted higher than other factors and in the case intrusion detection applications, low latency may be weighted higher than other applications.

Based on the parameters corresponding to respective ones of the applications and assigned weights of those parameters, the charging function 350 further determines transmission priority for data associated with the respective ones of the applications (e.g., APPs A, B, C and D). For example, applications for which relatively higher latencies may be permitted can be assigned lower priority than applications for which lower latencies are required. Referring to FIGS. 1 and 3, the orchestration layer 122 places the data in queues 351 corresponding to assigned priorities (e.g., Priority 1 having a higher priority than Priority 2). It is to be understood that although 2 levels of priorities are shown, there may be more than 2 priority levels.

Based on, for example, the transmission priorities, parameters, weights and/or SLA requirements, the orchestration layer 122 in conjunction with the policy application layer 121 assigns the data associated with the respective ones of the applications to a particular network and/or a particular portion of a network (e.g., network slice). As used herein, "network slices" or "network slicing" is to be broadly construed to refer to, for example, a network architecture enabling multiplexing of virtualized and independent logical networks on the same physical network infrastructure. A network slice may be an isolated end-to-end network tailored to fulfill the requirements of a given application. Some non-limiting examples of network slices include, for example, an ultra-reliable low latency connection (URLLC) network slice, an enhanced mobile broadband (eMBB) network slice and a massive machine-to-machine type communication (mMTC) network slice, which may correspond to IoT traffic. For example, augmented reality video traffic may require both eMBB (high bandwidth) and URLLC (low latency) characteristics.

Referring to FIG. 3, pipeline 1 352-1, pipeline 2 352-2, . . . , pipeline P 352-P (collectively "pipelines 352") represent the particular networks and/or particular portions of a network to which the data associated with the respective ones of the applications may be assigned. Different pipelines 352 may have different characteristics such as, but not necessarily limited to, low or high bandwidth, low or high latency and/or whether network security overlays are activated. Data in queues 351 may be stored in cache 126 before being transmitted over a selected network or network slice.

Referring to the table 400 in FIG. 4, inputs for each application A, B, C and D to the charging function 350 can include, for example, latency values, bandwidth values and whether network security is required. Some of the inputs are represented as follows: secure network (S-NW), low bandwidth (L-BW) and high bandwidth (H-BW). Assigned priorities can include, for example, 1: high priority traffic (e.g., for lower latency), and 2: low priority traffic (e.g., for higher latency). The charging function 350 in conjunction with the orchestration layer 122 dynamically routes the traffic according to the inputted parameters and network capabilities over, for example, an eMBB network slice for high bandwidth applications (e.g., video transmission) and/or a URLLC network slice for low latency, where processing closer to a user device 102 (e.g., at an edge computing site 105) may be required for rapid machine learning predictions or other actionable data. According to illustrative embodiments, for secure traffic, the data is encrypted. The embodiments utilize, for example, networks (e.g., 4G, 5G and/or private networks) where capabilities of the network may be dynamically defined. For example, the policy application layer 121 defines capabilities in network layers (e.g., L2 and L3 layers discussed herein below in connection with FIG. 5) to carry certain classes of traffic and allow services associated with applications and/or workloads to produce desired outputs. The classes of traffic may correspond to network slices, which may, for example support high bandwidth (e.g., eMBB) or low latency (e.g., URLLC). As an additional feature, the policy application layer 121, more particularly, the charging function 350, automatically maps the network slices to the respective applications, and prices the network slices to reflect the user, application, and SLA requirements, as well as the quality of service (QoS) provided by a given network slice. Pricing may also be characterized based on utilization of evolved packet core (EPC)) and/or multi-access edge computing (MEC) configurations.

The policy application layer 121 dynamically allocates underlying network resources to particular applications and/or workloads in order to adhere to user, application and/or SLA requirements. The policy application layer 121 defines policies that will deliver desired results without a need for users to be made aware of, for example, SLAs and capabilities of underlying networks. As a result, application processing may be segregated over different networks without users having to manually adjust and manage each underlying network or the resources associated with each underlying network. For example, applications which need classification in 5G SA or 5G NSA networks with a 4G core will be allocated to defined network slices with defined capabilities and cost.

Referring back to FIG. 1, user devices 102, edge devices at edge computing sites 105 and devices at core computing sites 106 such as, for example, servers, storage devices, send data to the support services engine 130 via the connection layer 131. The data is sent to an inventory layer 132 to classify the data, for example, based on origin. A cases layer 133 processes and aggregates the data to be utilized for support services and/or technical support cases. The operational data layer 134 filters the aggregated data for operational details, and the filtered data is stored in a data store 135 for future consumption by, for example a backend site 109 of an enterprise managing the user devices 102, the edge computing sites 105 and/or core computing sites 106.

Operational data for the user devices 102, edge devices at edge computing sites 105 and devices at core computing sites 106 has grown more complicated with the advent of data sprawl at edge locations and multiple types of user devices. Traditional methods of wired and wireless (e.g., WiFi and WiMAX) connectivity are insufficient for serving new data and service needs of customers and enterprises.

The network connectivity engine 120 in conjunction with the support services engine 130 supports a hybrid framework where devices utilizing newer networks (e.g., 4G, 5G and/or a private networks) and existing networks (e.g., wired and wireless networks) are connected to one or more backend sites 109 for actionable insights and management, as well as to edge and/or core computing sites 105 and 106 for application and/or workload processing.

The adapter layer 123 of the network connectivity engine 120 is utilized for communication and protocol integration. For example, the adapter layer 123 communicates with the connection layer 131 of the support services engine 130 to connect to user devices 102, edge devices at edge computing sites 105 and/or devices at core computing and backend sites 106 and 109 via newer communication networks such as, but not necessarily limited to 5G and 4G, as well as via legacy networks, like wired and wireless (e.g., WiFi and WiMAX) networks, in a brownfield deployment. The adapter layer 123 allows the support services engine 130 to interoperate with the devices regardless of their corresponding connectivity protocols. For example, a driver in the adapter layer 123 translates a variety of connectivity protocols associated with, for example, 4G and/or 5G networks, to a connectivity protocol used for broadband connections such as, but not necessarily limited to Internet Protocol over Ethernet (IPoE) or point-to-point over Ethernet (PPPoE) protocols.

In addition, once a network or network slice has been selected based on the user, SLA, application and workload requirements discussed herein above, the adapter layer 123 configures data for transmission over a selected network or network slice. For example, the adapter layer 123 identifies one or more connectivity protocol types in one or more packet fields of the data, and executes one or more interfaces for parsing the data to conform with the one or more connectivity protocols used by the selected network or network slice so that the data can be sent to edge and/or core computing sites 105 and 106 over the selected network or network slice. Data may be stored in cache 126 before being transmitted over the selected network or network slice.

Figure 5:
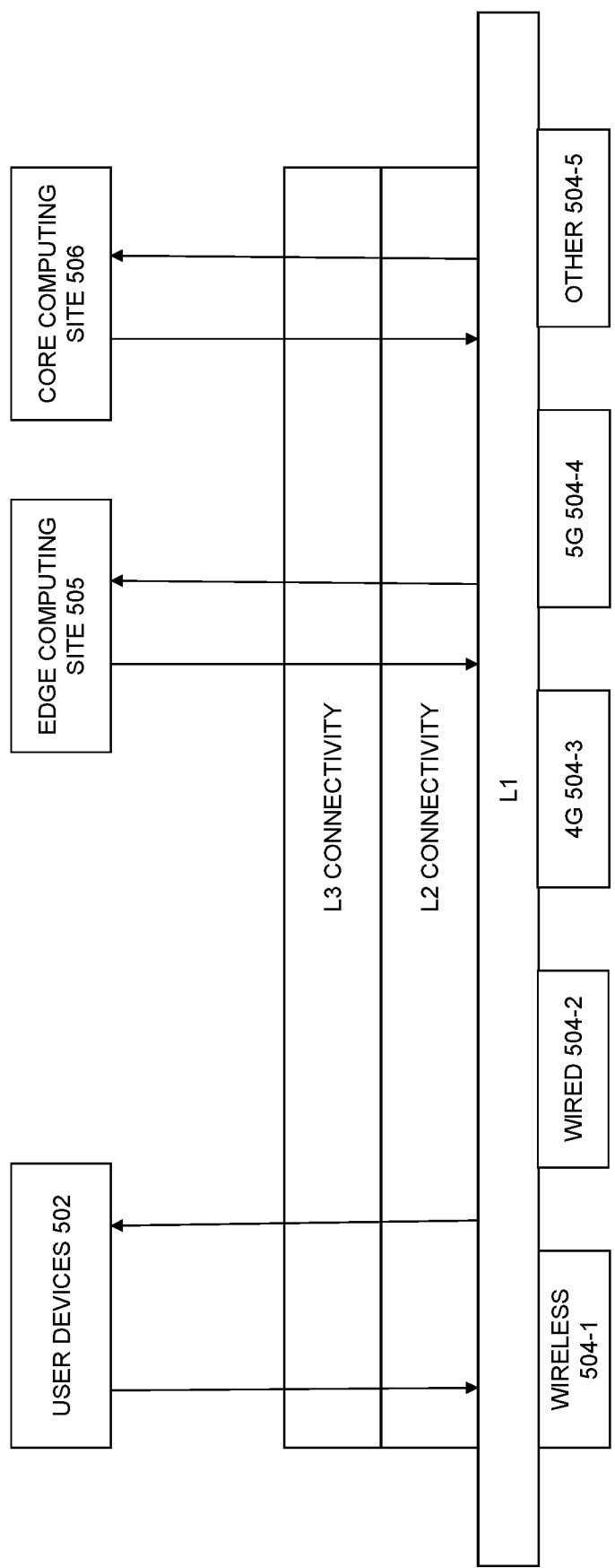
FIG. 5 depicts different connectivity arrangements between user devices and edge and core computing sites in an illustrative embodiment.

Referring to FIG. 5, the orchestrator layer 122 configures one or more network layers for the second network, wherein the one or more network layers (e.g., L2 and/or L3 connectivity layers) to support switching between one or more 4G networks and one or more 5G networks. The orchestrator layer 122 enables multi-stack (e.g., 4G and 5G) end-to-end communication from devices to the device management platform 110 and vice versa. As shown in FIG. 5, illustrative networks (e.g., wireless 504-1 (WiFi, WiMAX), wired 504-2, 4G 504-3, 5G 504-4, other 504-5), will allow for communication to take place between user devices 502 (the same as or similar to user devices 102) and edge and/or core computing sites 505 and/or 506 (the same as or similar to edge and core computing sites 105 and 106). As the network components form the L2/L3 connectivity layers of the Open Systems Interconnection (OSI) protocol stack, the resultant data forms a payload inside the corresponding L2/L3 packets being transmitted. FIG. 5 shows package data being transmitted down from user devices 502 and edge and/or core computing sites 505 and/or 506, and up from lower OSI layers (e.g., L1 layer). As noted herein above, the policy application layer 121 defines capabilities in network layers (e.g., L2 and L3 connectivity layers) to carry certain classes of traffic and allow services associated with applications and/or workloads to produce desired outputs. The classes of traffic may correspond to network slices, which may, for example support high bandwidth (e.g., eMBB) or low latency (e.g., URLLC).

In general, the L1 layer (Layer 1) corresponds to the physical aspects of networking such as, but not necessarily limited to, cabling, wiring, wiring standards, and which radio frequencies to use for WiFi. The L2 connectivity layer (Layer 2) corresponds to the transmission of data between nodes. For example, media access control (MAC) addresses exist in the L2 connectivity layer. The L3 connectivity layer (Layer 3) corresponds to a network layer providing a logical address of an endpoint (e.g., an IP address). Layer 3 addresses may be configured in an automated process.

In some non-limiting operational examples, the device management platform 110 integrates a 5G connection to devices (e.g., a user device 102 or a device in a core computing site 106) with a pLTE device at an edge computing site 105. In one operational example, a device requiring low latency in an existing datacenter is equipped with 5G capability by connecting a dongle or an adapter to the device. The policy application layer 121 maps a required service level (e.g., low latency in the case of a device that requires relatively quick processing such as for intrusion detection, thermal imaging for human virus detection, theft detection, etc.) to a URLLC network slice over a 5G SA connection to a 5G core. Any processing required of the application can then be deployed closer to the device by leveraging a 5G architecture. In this case, the operational data of the device is preserved in a manner that enables relatively quick (e.g., real-time) action at a processing location close to the device.

In another operational example, a device is configured to deliver rich video content to an end user on a field. In the field, a pLTE connection can readily deliver the required bandwidth for video delivered from a remote server via a 5G core eMBB network slice. In this case, the operational data for the user devices allows for optimal distribution of resources and correction of any failures or losses in service in an accelerated manner.

According to one or more embodiments, the data stores 125 and 135, cache 126 and other data stores, repositories or databases referred to herein can be configured according to a relational database management system (RDBMS) (e.g., PostgreSQL). In some embodiments, the data stores 125 and 135, cache 126 and other data stores, repositories or databases referred to herein are implemented using one or more storage systems or devices associated with the device management platform 110. In some embodiments, one or more of the storage systems utilized to implement the data stores 125 and 135, cache 126 and other data stores, repositories or databases referred to herein comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although shown as elements of the device management platform 110, the network connectivity engine 120 and/or support services engine 130 in other embodiments can be implemented at least in part externally to the device management platform 110, for example, as stand-alone servers, sets of servers or other types of systems coupled to the network 104. For example, the network connectivity engine 120 and/or support services engine 130 may be provided as cloud services accessible by the device management platform 110.

The network connectivity engine 120 and/or support services engine 130 in the FIG. 1 embodiment are each assumed to be implemented using at least one processing device. Each such processing device generally comprises at least one processor and an associated memory, and implements one or more functional modules for controlling certain features of the network connectivity engine 120 and/or support services engine 130.

At least portions of the device management platform 110 and the elements thereof may be implemented at least in part in the form of software that is stored in memory and executed by a processor. The device management platform 110 and the elements thereof comprise further hardware and software required for running the device management platform 110, including, but not necessarily limited to, on-premises or cloud-based centralized hardware, graphics processing unit (GPU) hardware, virtualization infrastructure software and hardware, Docker containers, networking software and hardware, and cloud infrastructure software and hardware.

Although the network connectivity engine 120, support services engine 130 and other elements of the device management platform 110 in the present embodiment are shown as part of the device management platform 110, at least a portion of the network connectivity engine 120, support services engine 130 and other elements of the device management platform 110 in other embodiments may be implemented on one or more other processing platforms that are accessible to the device management platform 110 over one or more networks. Such elements can each be implemented at least in part within another system element or at least in part utilizing one or more stand-alone elements coupled to the network 104.

It is assumed that the device management platform 110 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The term "processing platform" as used herein is intended to be broadly construed so as to encompass, by way of illustration and without limitation, multiple sets of processing devices and one or more associated storage systems that are configured to communicate over one or more networks.

As a more particular example, the network connectivity engine 120, support services engine 130 and other elements of the device management platform 110, and the elements thereof can each be implemented in the form of one or more LXCs running on one or more VMs. Other arrangements of one or more processing devices of a processing platform can be used to implement the network connectivity engine 120 and support services engine 130, as well as other elements of the device management platform 110. Other portions of the system 100 can similarly be implemented using one or more processing devices of at least one processing platform.

Distributed implementations of the system 100 are possible, in which certain elements of the system reside in one data center in a first geographic location while other elements of the system reside in one or more other data centers in one or more other geographic locations that are potentially remote from the first geographic location. Thus, it is possible in some implementations of the system 100 for different portions of the device management platform 110 to reside in different data centers. Numerous other distributed implementations of the device management platform 110 are possible.

Accordingly, one or each of the network connectivity engine 120, support services engine 130 and other elements of the device management platform 110 can each be implemented in a distributed manner so as to comprise a plurality of distributed elements implemented on respective ones of a plurality of compute nodes of the device management platform 110.

It is to be appreciated that these and other features of illustrative embodiments are presented by way of example only, and should not be construed as limiting in any way. Accordingly, different numbers, types and arrangements of system elements such as the network connectivity engine 120, support services engine 130 and other elements of the device management platform 110, and the portions thereof can be used in other embodiments.

It should be understood that the particular sets of modules and other elements implemented in the system 100 as illustrated in FIG. 1 are presented by way of example only. In other embodiments, only subsets of these elements, or additional or alternative sets of elements, may be used, and such elements may exhibit alternative functionality and configurations.

For example, as indicated previously, in some illustrative embodiments, functionality for the device management platform can be offered to cloud infrastructure customers or other users as part of FaaS, CaaS and/or PaaS offerings.

Figure 6:
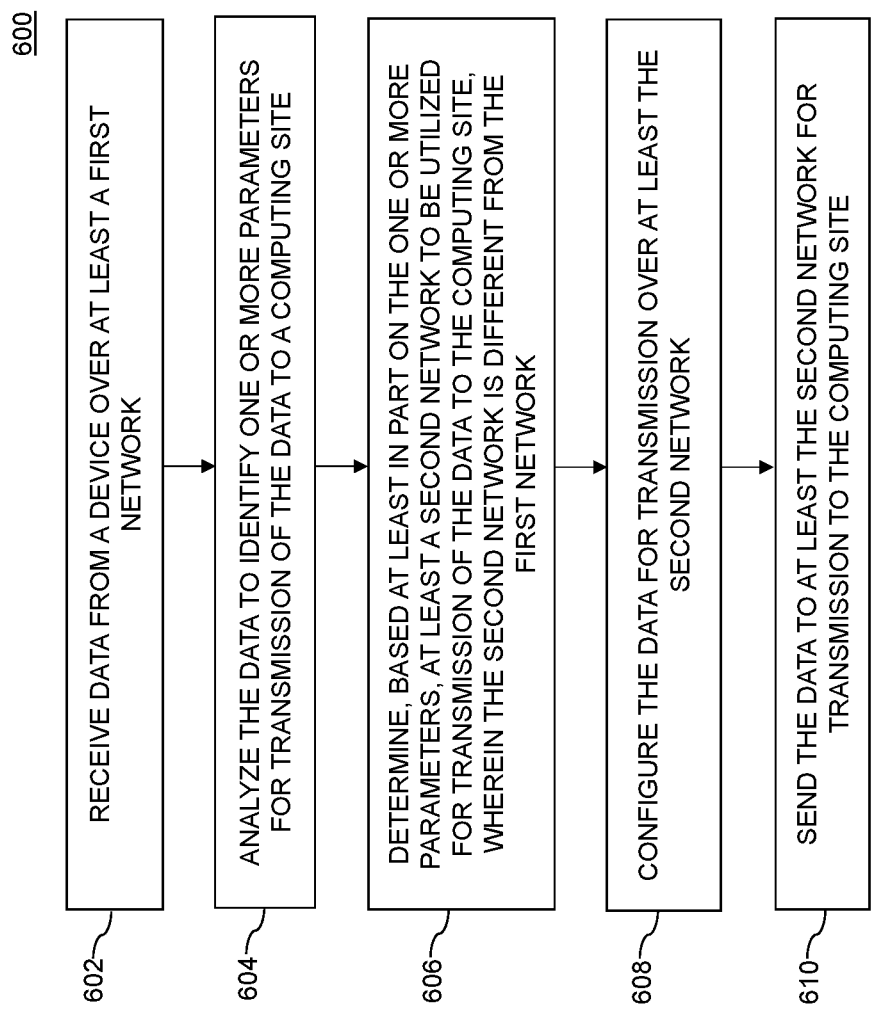
FIG. 6 depicts a process for orchestrating network connectivity in connection with device management operations according to an illustrative embodiment.

The operation of the information processing system 100 will now be described in further detail with reference to the flow diagram of FIG. 6. With reference to FIG. 6, a process 600 for orchestrating network connectivity in connection with device management operations as shown includes steps 602 through 610, and is suitable for use in the system 100 but is more generally applicable to other types of information processing systems comprising a device management platform configured for orchestrating network connectivity in connection with device management operations.

In step 602, data is received from a device over at least a first network. In step 604, the data is analyzed to identify one or more parameters for transmission of the data to a computing site. The one or more parameters for transmission of the data comprise, for example, latency, bandwidth, security and/or data gravity. The computing site comprises, for example, an edge computing site and/or a core computing site.

In step 606, based at least in part on the one or more parameters, at least a second network to be utilized for transmission of the data to the computing site is determined. The second network is different from the first network. The first network comprises, for example, a wired network and/or a wireless network, and the second network comprises, for example, a 4G, a 5G and/or a pLTE network. In the case of a private network, one or more capabilities of the private network are configured based, at least in part, on the one or more parameters. In step 608, the data is configured for transmission over at least the second network, and in step 610, the data is sent to at least the second network for transmission to the computing site.

In illustrative embodiments, the analyzing of the data comprises identifying a plurality of applications from the data, the plurality of applications specifying the one or more parameters, and identifying which of the one or more parameters correspond to respective ones of the plurality of applications. The determining of at least the second network to be utilized for transmission of the data comprises assigning weights to respective parameters of the one or more parameters, determining transmission priorities of respective subsets of the data corresponding to the respective ones of the plurality of applications, and assigning the respective subsets of the data corresponding to different transmission priorities to different portions of the second network. The different portions of the second network comprise, for example, a URLLC network slice and an eMBB network slice.

In illustrative embodiments, a plurality of connectivity protocols for transmitting the data are translated to a connectivity protocol used for broadband connections such as, for example, IPoE or PPPoE.

The configuring of the data for transmission over at least the second network may comprise identifying one or more connectivity protocol types in one or more packet fields of the data and executing one or more interfaces for parsing the data to conform with one or more connectivity protocols. One or more network layers for the second network may be configured, wherein the one or more network layers support switching between one or more 4G networks and one or more 5G networks.

It is to be appreciated that the FIG. 6 process and other features and functionality described above can be adapted for use with other types of information systems configured to execute network connectivity services in a device management platform or other type of platform.

The particular processing operations and other system functionality described in conjunction with the flow diagram of FIG. 6 are therefore presented by way of illustrative example only, and should not be construed as limiting the scope of the disclosure in any way. Alternative embodiments can use other types of processing operations. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Illustrative embodiments of systems with a device management platform as disclosed herein can provide a number of significant advantages relative to conventional arrangements. For example, the device management platform effectively provides a framework for orchestration and management of hybrid network architectures allowing for transparent transit from existing legacy networks (e.g., wired, WiFi and WiMAX networks) to newly introduced networks (e.g., 4G and 5G networks). The embodiments advantageously provide for fully automated control and management of network generation, of network selection and of transitions between multiple networks or network slices in a zero-touch provisioning (ZTP) model.

As an additional advantage, the embodiments provide techniques for enabling conventional device management architectures operating over wired and wireless (e.g., WiFi and WiMAX) connections to also utilize 4G, 5G and pLTE networks for connections to edge nodes. The embodiments advantageously address the increases in devices and data at edge locations to provide techniques for maintaining current service levels to end-users and enterprise customers. By expanding connectivity options, the embodiments enable faster data processing closer to the data source, resulting in increased output reliability and user satisfaction.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines and/or container sets implemented using a virtualization infrastructure that runs on a physical infrastructure. The cloud infrastructure further comprises sets of applications running on respective ones of the virtual machines and/or container sets.

These and other types of cloud infrastructure can be used to provide what is also referred to herein as a multi-tenant environment. One or more system elements such as the device management platform 110 or portions thereof are illustratively implemented for use by tenants of such a multi-tenant environment.

As mentioned previously, cloud infrastructure as disclosed herein can include cloud-based systems. Virtual machines provided in such systems can be used to implement at least portions of one or more of a computer system and a device management platform in illustrative embodiments. These and other cloud-based systems in illustrative embodiments can include object stores.

Illustrative embodiments of processing platforms will now be described in greater detail with reference to FIGS. 7 and 8. Although described in the context of system 100, these platforms may also be used to implement at least portions of other information processing systems in other embodiments.

Figure 7:
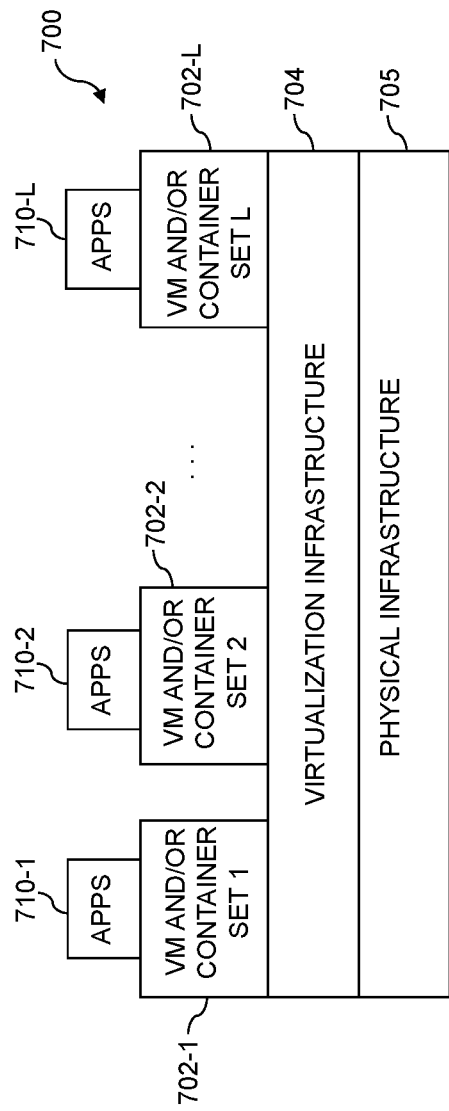
FIGS. 7 and 8 show examples of processing platforms that may be utilized to implement at least a portion of an information processing system according to illustrative embodiments.
Figure 8:
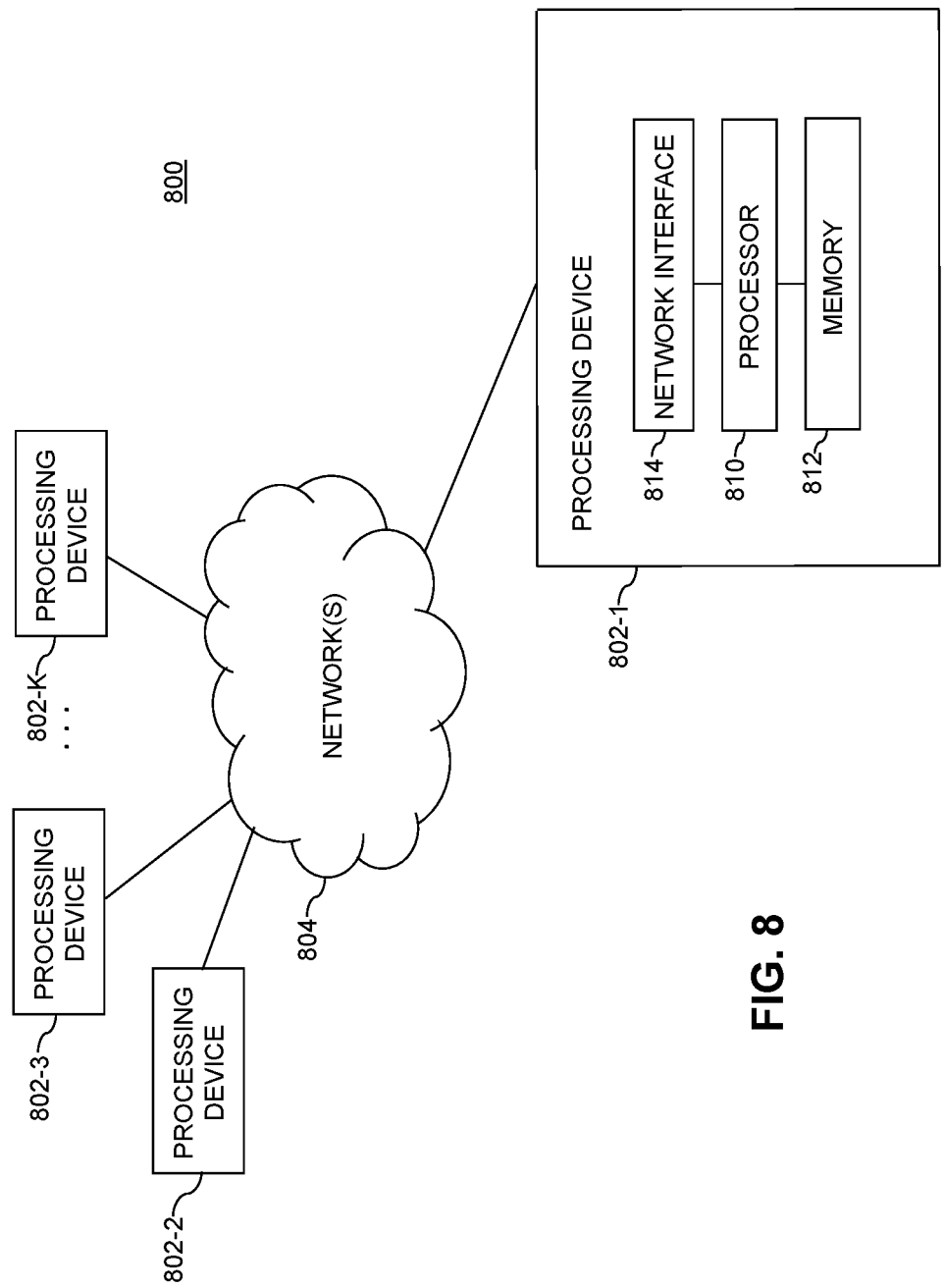

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-L implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-L running on respective ones of the VMs/container sets 702-1, 702-2, . . . 702-L under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. A hypervisor platform may be used to implement a hypervisor within the virtualization infrastructure 704, where the hypervisor platform has an associated virtual infrastructure management system. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812. The processor 810 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 812 may comprise random access memory (RAM), read-only memory (ROM), flash memory or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality of one or more elements of the device management platform 110 as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems and device management platforms. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method comprising:

receiving data from a device over at least a first network;

analyzing the data to identify one or more parameters for transmission of at least a particular portion of the data to a computing site;

determining, based at least in part on the one or more parameters, at least a second network to be utilized for transmission of at least the particular portion of the data to the computing site, wherein the second network is different from the first network;

configuring at least the particular portion of the data for transmission over at least the second network; and sending at least the particular portion of the data to at least the second network for transmission to the computing site;

wherein the receiving, analyzing, determining, configuring and sending are performed in a device management platform coupled between the device from which the data is received and a plurality of computing sites including a plurality of edge computing sites and a plurality of core computing sites, and further comprise identifying a first portion of the data associated with a first application executing on the device and to be processed in a particular one of the edge computing sites and a second portion of the data associated with a second application executing on the device, the second application being different than the first application, and to be processed in a particular one of the core computing sites, the particular portion of the data being one of the first and second portions and being sent to a corresponding one of the particular edge and core computing sites over the second network;

wherein the steps of the method are executed by at least one processing device operatively coupled to a memory, the at least one processing device being part of the device management platform.

2. The method of claim 1 wherein the first network comprises at least one of a wired network and a wireless network, and the second network comprises at least one of a fourth generation (4G), a fifth generation (5G) network and a private long-term evolution (pLTE) network.

3. The method of claim 1 wherein the one or more parameters for transmission of at least the particular portion of the data comprise at least one of latency, bandwidth, security and data gravity.

4. The method of claim 1 wherein the analyzing of at least the particular portion of the data comprises:

identifying a plurality of applications from at least the particular portion of the data, the plurality of applications specifying the one or more parameters; and identifying which of the one or more parameters correspond to respective ones of the plurality of applications.

5. The method of claim 4 wherein the determining of at least the second network to be utilized for transmission of at least the particular portion of the data comprises:

assigning weights to respective parameters of the one or more parameters; and determining transmission priorities of respective subsets of the data corresponding to the respective ones of the plurality of applications.

6. The method of claim 5 wherein the determining of at least the second network to be utilized for transmission of at least the particular portion of the data further comprises assigning the respective subsets of the data corresponding to different transmission priorities to different portions of the second network.

7. The method of claim 6 wherein the different portions of the second network comprise an ultra-reliable low latency connection (URLLC) network slice and an enhanced mobile broadband (eMBB) network slice.

8. The method of claim 1 further comprising translating a plurality of connectivity protocols for transmitting at least the particular portion of the data to a connectivity protocol used for broadband connections.

9. The method of claim 8 wherein the connectivity protocol used for broadband connections comprises Internet Protocol over Ethernet (IPoE).

10. The method of claim 1 wherein the configuring of at least the particular portion of the data for transmission over at least the second network comprises identifying one or more connectivity protocol types in one or more packet fields of at least the particular portion of the data.

11. The method of claim 1 wherein the configuring of at least the particular portion of the data for transmission over at least the second network comprises executing one or more interfaces for parsing at least the particular portion of the data to conform with one or more connectivity protocols.

12. The method of claim 1 further comprising configuring one or more network layers for the second network, wherein the one or more network layers support switching between one or more fourth generation (4G) networks and one or more fifth generation (5G) networks.

13. The method of claim 1 wherein the second network comprises a private network, and the method further comprises configuring one or more capabilities of the private network based, at least in part, on the one or more parameters.

14. The method of claim 1 wherein the device from which the data is received over at least the first network is not configured for direct communication with the particular edge and core computing sites over the second network.

15. An apparatus comprising:

a processing device operatively coupled to a memory and configured:

to receive data from a device over at least a first network;

to analyze the data to identify one or more parameters for transmission of at least a particular portion of the data to a computing site;

to determine, based at least in part on the one or more parameters, at least a second network to be utilized for transmission of at least the particular portion of the data to the computing site, wherein the second network is different from the first network;

to configure at least the particular portion of the data for transmission over at least the second network; and to send at least the particular portion of the data to at least the second network for transmission to the computing site;

wherein the receiving, analyzing, determining, configuring and sending are performed in a device management platform coupled between the device from which the data is received and a plurality of computing sites including a plurality of edge computing sites and a plurality of core computing sites, and further comprise identifying a first portion of the data associated with a first application executing on the device and to be processed in a particular one of the edge computing sites and a second portion of the data associated with a second application executing on the device, the second application being different than the first application, and to be processed in a particular one of the core computing sites, the particular portion of the data being one of the first and second portions and being sent to a corresponding one of the particular edge and core computing sites over the second network.

16. The apparatus of claim 15 wherein, in configuring at least the particular portion of the data for transmission over at least the second network, the processing device is configured to execute one or more interfaces for parsing at least the particular portion of the data to conform with one or more connectivity protocols.

17. The apparatus of claim 15 wherein the processing device is further configured to configure one or more network layers for the second network, wherein the one or more network layers support switching between one or more fourth generation (4G) networks and one or more fifth generation (5G) networks.

18. An article of manufacture comprising a non-transitory processor-readable storage medium having stored therein program code of one or more software programs, wherein the program code when executed by at least one processing device causes said at least one processing device to perform the steps of:

receiving data from a device over at least a first network;

analyzing the data to identify one or more parameters for transmission of at least a particular portion of the data to a computing site;

determining, based at least in part on the one or more parameters, at least a second network to be utilized for transmission of at least the particular portion of the data to the computing site, wherein the second network is different from the first network;

configuring at least the particular portion of the data for transmission over at least the second network; and sending at least the particular portion of the data to at least the second network for transmission to the computing site;

wherein the receiving, analyzing, determining, configuring and sending are performed in a device management platform coupled between the device from which the data is received and a plurality of computing sites including a plurality of edge computing sites and a plurality of core computing sites, and further comprise identifying a first portion of the data associated with a first application executing on the device and to be processed in a particular one of the edge computing sites and a second portion of the data associated with a second application executing on the device, the second application being different than the first application, and to be processed in a particular one of the core computing sites, the particular portion of the data being one of the first and second portions and being sent to a corresponding one of the particular edge and core computing sites over the second network.

19. The article of manufacture of claim 18 wherein, in configuring at least the particular portion of the data for transmission over at least the second network, the program code causes said at least one processing device to execute one or more interfaces for parsing at least the particular portion of the data to conform with one or more connectivity protocols.

20. The article of manufacture of claim 18 wherein the program code further causes said at least one processing device to configure one or more network layers for the second network, wherein the one or more network layers support switching between one or more fourth generation (4G) networks and one or more fifth generation (5G) networks.

* * * * *